United States Patent [19]

Gladden

[11] 4,165,106

[45] Aug. 21, 1979

[54] HOSE OR PIPE COUPLING

[76] Inventor: James B. Gladden, 1146 King Industrial Dr., Marietta, Ga. 30062

[21] Appl. No.: 836,491

[22] Filed: Sep. 26, 1977

[51] Int. Cl.² ............................................. F16L 19/02
[52] U.S. Cl. ...................................... 285/39; 285/169; 285/354
[58] Field of Search ................ 285/354, 347, 39, 169, 285/386, 353

[56] References Cited

U.S. PATENT DOCUMENTS

| 904,673 | 11/1908 | Bideker | 285/354 X |
|---|---|---|---|
| 1,126,056 | 1/1915 | Madigan | 285/331 |
| 1,262,263 | 4/1918 | Rust | 285/354 X |
| 1,875,330 | 9/1932 | Eisenman | 285/347 X |
| 1,898,617 | 2/1933 | Church | 285/39 |
| 2,284,216 | 5/1942 | Kunkel | 285/353 X |
| 2,661,965 | 12/1953 | Parmesan | 285/347 X |
| 2,696,395 | 12/1954 | Ellis | 285/347 X |
| 3,476,414 | 11/1969 | Condrac | 285/354 X |
| 3,486,771 | 12/1969 | Conlin | 285/39 |

FOREIGN PATENT DOCUMENTS

| 562641 | 12/1957 | Belgium | 285/354 |
|---|---|---|---|
| 1098480 | 3/1955 | France | 285/347 |
| 984947 | 3/1965 | United Kingdom | 285/354 |

*Primary Examiner*—Thomas F. Callaghan
*Attorney, Agent, or Firm*—Newton, Hopkins & Ormsby

[57] ABSTRACT

A quick disconnect coupling for high pressure hoses or pipes of various diameters features safety, ease and convenience of assembly and disassembly and simplicity of construction. The coupling is a separate assembly from the hose or pipe with which it is connected rather than being contiguous therewith. Only three coupling components and a ring type resilient seal are involved in the coupling. The two interfitting coupling elements have wrench flats thereon and a threaded collar positively holds the coupling elements in assembled relationship.

3 Claims, 3 Drawing Figures

HOSE OR PIPE COUPLING

BACKGROUND OF THE INVENTION

A variety of hose and pipe couplings are known both in the commercial and patented prior art. Some examples of the known patented prior art are contained in U.S. Pat. Nos. 1,126,056; 2,342,834; 2,449,121; 3,142,498.

Generally speaking in the prior art, high pressure hose and pipe couplings have tended to be complex and rather costly, as well as somewhat inconvenient to use or manipulate. Less costly arrangements simply will not serve adequately for high pressure requirements and are not leak-proof under operating conditions.

With the above deficiencies of the prior art in mind, the objective of this invention is to provide a safe, convenient, efficient and leak-proof coupling of simplified and economical construction for use with hoses and pipes carrying high pressure water or water solutions and applicable to a wide range of hose or pipe sizes.

The invention features a quick disconnect capability and a leak-proof seal between the male and female coupling components which has sliding engagement for assembling without the necessity for any tools. The coupling components are corrosion and rust resistant and are constructed for mechanical and hydraulic strength and safety.

Other features and advantages of the invention will become apparent during the course of the following description.

DETAILED DESCRIPTION

Figure 1:
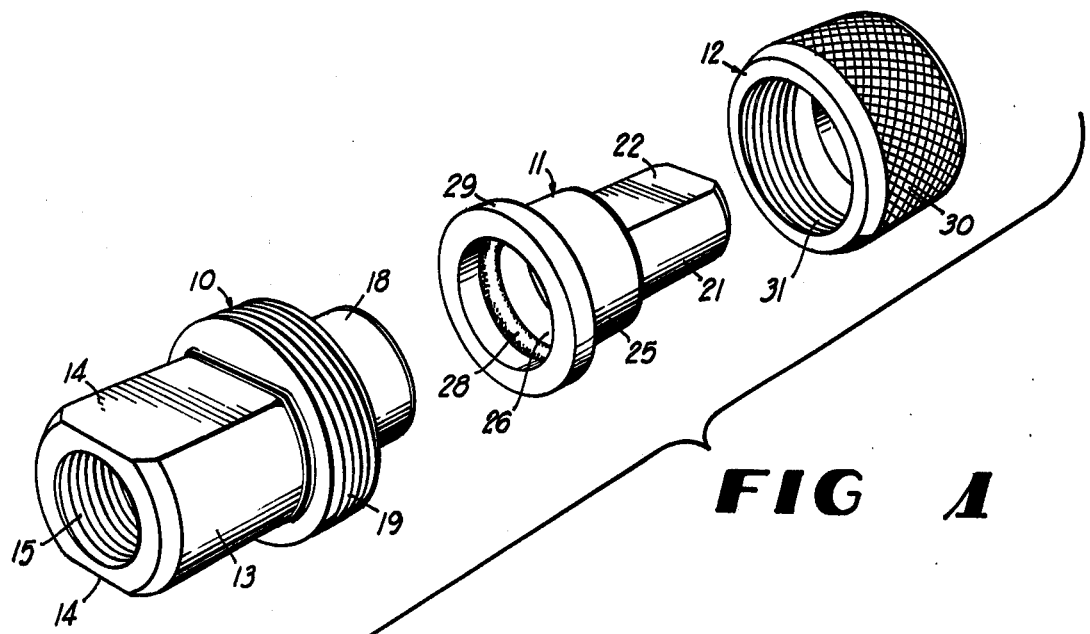
FIG. 1 is an exploded perspective view of the hose or pipe coupling embodying the invention.
Figure 2:
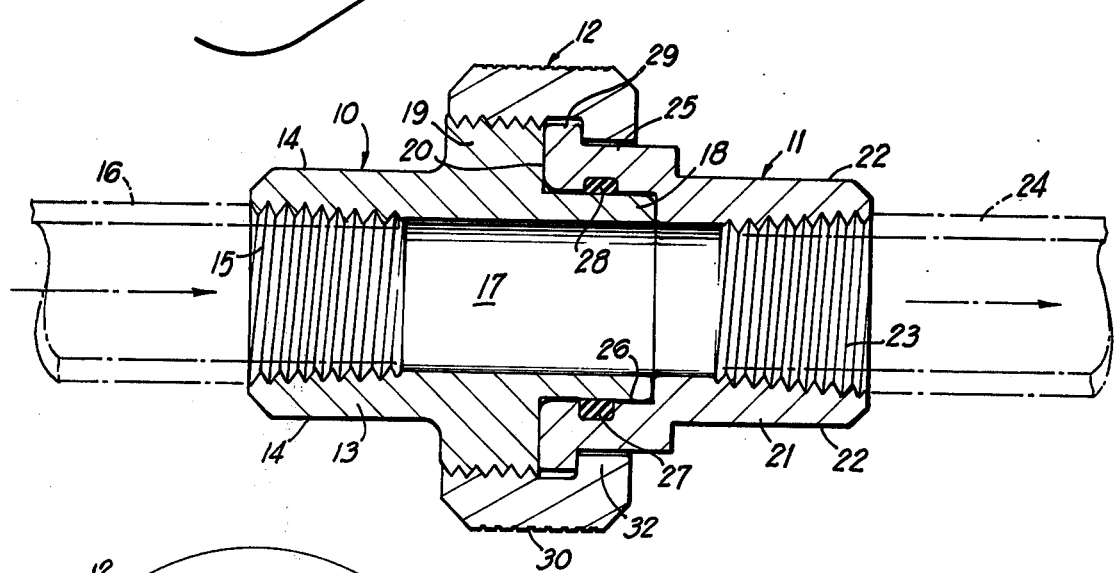
FIG. 2 is an assembled central vertical longitudinal section through the coupling.
Figure 3:
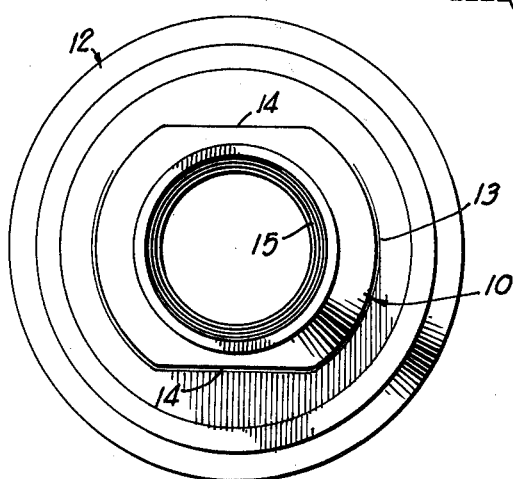
FIG. 3 is an end elevational view of the coupling.

Referring to the drawings in detail, wherein like numerals designate like parts, a quick release coupling for high pressure hoses or pipes comprises essentially a male coupling element 10, an interfitting female coupling element 11, and a threaded collar or sleeve 12 which maintains the two coupling elements 10 and 11 securely in sealed assembled relationship. A characteristic of the coupling assembly formed by the elements 10, 11 and 12 is that the assembly is a separate entity from the hose or pipe sections with which it is joined rather than being contiguous or integral therewith.

More particularly, the male coupling element 10, like the other elements 11 and 12, is preferably formed of stainless steel and has an outer end cylindrical portion 13 provided with a pair of diametrically opposed parallel wrench flats 14. The outer end portion 13 is also internally threaded at 15 preferably with a tapered pipe thread to receive the threaded end of a pipe 16 or the threaded fitting of a hose. Inwardly of the threads 15, the male coupling element 10 has a cylindrical bore 17 extending through its inner end. The element 10 has an inner end cylindrical sleeve portion 18 of somewhat reduced outside diameter compared to the portion 13, and between the two end portions 13 and 18, the male coupling element 10 has an enlarged diameter screw-threaded body portion 19 forming a flat annular shoulder 20 on one end thereof normal to the periphery of the sleeve portion 18. The male coupling element 10 is of one piece construction.

The female coupling element 11, also of one-piece construction, comprises an outer end cylindrical portion 21 having diametrically opposed parallel wrench flats 22 and internal pipe threads 23 for receiving one threaded end of a pipe 24 or a threaded hose fitting. The female coupling element has an intermediate enlarged diameter sleeve section 25 concentric with the end portion 21 whose bore 26 is provided with an annular groove 27 receiving and seating a conventional resilient O-ring seal 28. At its interior end, the female coupling element 11 carries an annular flange 29 which extends radially beyond the sleeve section 25 for cooperation with the previously-mentioned threaded collar 12.

The collar or coupling sleeve 12 is knurled externally at 30 and is provided in one end with internal screw-threads 31 for engagement with the externally threaded portion 19 of the male coupling element 10. At its other end, the collar 12 has an internal annular flange or shoulder 32 whose bore fits over the sleeve portion 25 of female coupling element 11 and whose forward face engages one side of the annular flange 29 for clamping this flange in abutment with the annular surface or shoulder 20 of the male coupling element.

When the three part coupling is to be assembled, it is merely necessary to slide the sleeve portion 25 of the female element 11 over the sleeve portion 18 of the male element 10 until the forward face of flange 29 abuts the shoulder 20. No tools are required for this operation and no tools are required for the subsequent separation of the elements 10 and 11. When the male and female elements are interfitted in this manner, the resulting compression of the ring seal 28 will assure an effective high pressure leak-proof seal in the assembled coupling. The collar or sleeve 12 is now threaded onto the portion 19 and tightened for clamping the flange 29 between the shoulder 20 and the flange 32 and the assembling of the hose or pipe coupling is complete.

The threaded collar or sleeve 12, when tightened, holds the two coupling elements 10 and 11 in end-to-end abutment at the shoulder 20 while the sleeve portion 18 is fully telescoped into the sleeve portion 25. Thus, the connection is both rigid and leak-proof as well as very simple in construction and convenient to assemble and separate due to the slip fit telescoping relationship of the two elements 10 and 11. The advantages of the device over the prior art should now be readily apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A leak-proof high pressure coupling for hoses or pipes comprising telescopically interfitting male and female coupling elements defining in assembled relationship a through passage for fluid, a compressed ring seal disposed between the telescopically interfitting parts of said male and female coupling elements, said telescopically interfitting parts having a sliding fit, abutment faces on said male and female coupling elements arranged in positive engagement when said male and female coupling elements are fully engaged telescopically, thereby providing a sealing effect by at least four abutting faces free of any interposed gaps, screwthreads on the exterior of one of said coupling elements, and a threaded coupling collar engageable with said screw-threads and having a flange for abutment with the other coupling element to releasably hold said abutment faces in positive engagement, thereby providing an additional sealing effect by at least two more abutting faces free of any interposed gaps, said male coupling element having a leading cylindrical sleeve including a first annular end abutment face normal to said sleeve, the female coupling element also having a sleeve portion telescopically receiving said leading sleeve and having a second annular abutment face normal to said sleeve portion and extending from the internal surface of said sleeve portion to the bore of said female coupling element, said sleeve portion of the female coupling element having an internal annular groove receiving said ring seal, said compressed ring seal being disposed between said sleeve and sleeve portion, said ring seal being a rubber-like O-ring seal, said male coupling element having an enlarged theaded portion rearwardly of said sleeve defining a third annular abutment face normal to said sleeve, and an annular flange on said sleeve portion of the female coupling element having a fourth annular end abutment face normal to said sleeve portion and in opposing relationship to said third abutment face, said theaded coupling collar flange engaging rearwardly of the flange on the female coupling element to hold said additional abutting faces in positive sealing contact, the parts being so proportioned that when said flange on the female coupling element is so held, the said telescopically interfitting parts will be held in full telescoping relationship with said first and second faces and said third and fourth faces in positive sealing abutting engagement, and the bores of the male and female coupling elements having screw-threads to receive threaded pipe sections or threaded hose fittings.

2. A leak-proof high pressure coupling as defined in claim 1 wherein each of said male and female coupling elements have opposite side wrench flats.

3. A leak-proof high pressure coupling as defined in claim 1 wherein said annular flange on the sleeve portion of the female coupling element being of somewhat lesser diameter than the screw-threads of said coupling collar, and said coupling collar flange having an internal diameter substantially smaller than the external diameter of the flange of said sleeve portion of the female coupling element.

* * * * *